United States Patent [19]

Ayers et al.

[11] 4,199,852

[45] Apr. 29, 1980

[54] WINDSHIELD REMOVER

[76] Inventors: Lewis W. Ayers, 35141 Mesa Grande, Calimosa, Calif. 02320; William A. Chellel, 8541 Barry Pl., Westminister, Calif. 92683

[21] Appl. No.: 963,224

[22] Filed: Nov. 22, 1978

[51] Int. Cl.[2] .............................................. B23P 19/04

[52] U.S. Cl. .......................................... 29/239; 29/270

[58] Field of Search .................. 29/239, 270, 275, 278

[56] References Cited

U.S. PATENT DOCUMENTS

| | | | |
|---|---|---|---|
| 2,761,199 | 9/1956 | Allen | 29/270 |
| 3,372,459 | 3/1968 | Lambright | 29/270 |
| 3,744,113 | 7/1973 | Sarvay et al. | 29/270 |

*Primary Examiner*—James L. Jones, Jr.

[57] ABSTRACT

A semi-automatic windshield remover capable of removing automobile windshields is presented. The remover comprises an airtool and an attachment capable of being coupled to the airtool and powered by the airtool. The attachment comprises an longitudinal base having a first end capable of coupling to the airtool and a second end which is applied to the windshield. The second end includes blade means capable of being inserted between the edge of the windshield and the frame coupling the windshield to the automobile and roller means with the circumference of the roller means disposed about one quarter inch from the end of the blade, the end of the blade being parallel to the axis of the roller means but disposed about an inch from the axis of the roller means. The blade comprises and L-shape member having generally triangular shoulders perpendicular to the L. The shoulders maintain the blade in the proper position during the cutting which removes the windshield from the automobile frame.

In operation, the windshield remover is coupled to the airtool which is turned on. The blade is inserted at the edge of the windshield between the windshield and the automobile frame, and the blade is moved along the edge of the windshield, separating the windshield from the automobile.

2 Claims, 7 Drawing Figures

WINDSHIELD REMOVER

BACKGROUND OF THE INVENTION

1. Field of the Invention

The present invention relates to tools used to remove windshields from automobiles.

2. Description of the Prior Art

Junking of automobiles and automobile repair are done in every major metropolitan area, and in many smaller areas. The tools used are normally a function of the volume of the business, with more specialized tools being used by businesses which have a greater volume. The factor which determines whether a business uses a more specialized tool is, of course, the cost of the tool. A tool will be used only if the owner of the business feels that it is profitable. One of the tools frequently found is an airtool which is used to power wrenches and a substantial number of other mechanical tools which greatly increase the productivity of the business. Any tool capable of being powered by an airtool is likely to be relatively inexpensive to purchase, and, if it meets a need, can be purchased by even the smaller businesses.

Removal of windshields at most small auto junking and repair businesses is perhaps not too different from the technique used by the homeowner when he has to repair a window. You break out those pieces that still remain, and remove the pieces around the edge by hand, where necessary. This work is time consumming and tedious, because of the danger that a slight mistake will result in a severe cut by broken glass. The prior art discloses no simple inexpensive tool permitting the quick, efficient and safe removal of windshields.

In addition, substantial numbers of cars junked have windshields which could be used in other cars to replace broken windshields. These windshields are presently frequently removed by using a knife. Because the knife is not powered, it must be very sharp, and the work is tedious and inefficient because of the strength of the binding material which must be overcome by the knife and because of the great care that must be exercised to make certain that the windshield is removed and in good condition. The prior art discloses no simple efficient inexpensive tool to assist in this work.

SUMMARY OF THE INVENTION

A windshield remover suitable for use with an airtool, capable of removing automobile windshields is presented. The remover comprises an attachment capable of being coupled to the airtool and powered by the airtool. The attachment has a longitudinal base having a first end capable of coupling to the airtool. The second end of the base is coupled by coupling means to roller means and to blade means capable of being inserted between the edge of the windshield and the frame coupling the windshield to the automobile. The circumferential edge of the roller means is disposed of about one quarter inch from the end of the blade, the end of the blade being parallel to the axis of the roller means but disposed about an inch from the axis of the roller means. The blade means comprises an L-shaped member with the first end forming a shoulder and the second end forming the point of the blade.

The base is disposed about an axis. The second end of the base has a surface defining a planar slot parallel to the axis and a bore near the center of the slot and perpendicular to the slot. The bore of the base may be symmetrical about an axis intercepting the axis of the base at a 90 degree angle. The surface of the base near the second end may define a generally planar groove perpendicular to the bore of the base on the side of the base to which the roller is coupled. The roller means may be axially symmetric and axially coupled to the coupling means coupled to the bore of the base and capable of rotating around the coupling means. The roller means have a radius greater than the distance from the center of the bore to the end of the second end of the base and a diameter greater than the greatest thickness of the base.

The blade means are L-shaped and have a first stem end comprising a generally arrow shaped generally planar shoulder slightly less thick than the thickness of the slot of the base. The length of the two edges of the arrow adjacent what would be the point of the arrow if it had a point, substantially exceed the distance from the bore to the edge of the base. The end of the arrow where a point would normally be is rounded off. The surface of the arrow defines a bore perpendicular to the plane of the arrow by means of which bore the arrow is coupled rotatably to the coupling means and retained within the slot of the base such that the end of the arrow does not contact the surface defining the slot. The blade means bends at a 90 degree angle at a distance from the bore slightly greater than the radius of the roller, forming a point on the same side of the base as the roller means, but farther from the axis of the base than the farthest surface of the roller. The point is capable of being inserted between the edge of automobile windshields and the frame coupling each windshield to the automobile which contains the windshield.

In operation, the base is coupled to an airtool and the point of the blade is inserted between the windshield and the frame of the automobile. Power from the airtool causes the base to move, causing the blade to move, separating the windshield from the frame. The operator guides the blade around the windshield, separating the entire windshield from the auto frame. A second person or appropriate mechanical means may be utilized to catch the windshield when it falls out of the frame.

The two edges of the arrow adjacent to the rounded off end are generally perpendicular to each other and slightly less than twice the greatest width of the second end of the base. The distance between the bore through the arrow and the 90 degree bend of the blade exceeds the radius of the roller by about one quarter inch so that the second end of the blade containing the point extends nearly one quarter inch beyond the edge of the roller. The point of the blade may extend farther from the axis of the base than the roller does, so as to permit the point to pass securely through all the binding material binding the windshield to the frame, thereby insuring that the windshield is separated from the frame.

DRAWING DESCRIPTION

Reference should be made at this time to the following detailed description which should be read in conjunction with the following drawings, of which:

DETAILED DESCRIPTION

Figure 1:
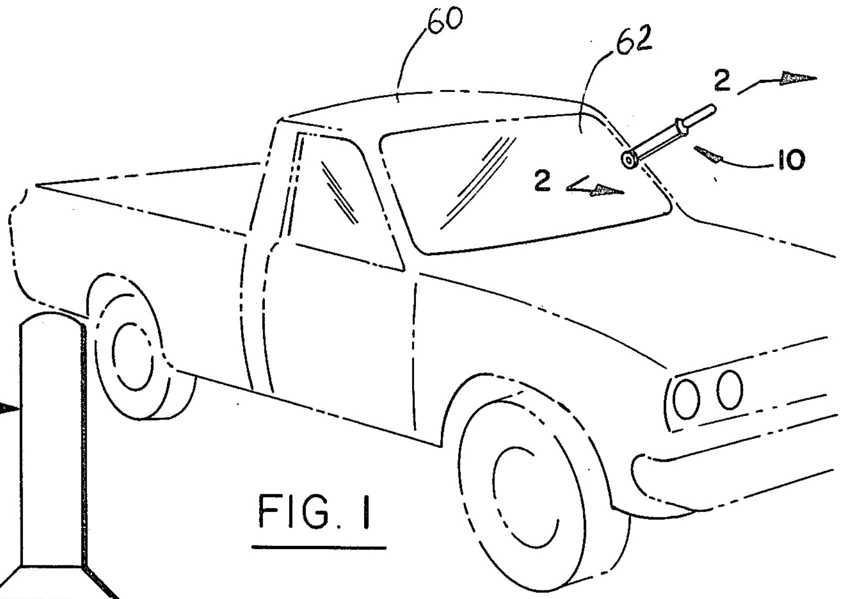
FIG. 1 is a ¾ elevated view of an automobile showing the windshield remover removing the windshield.
Figure 2:
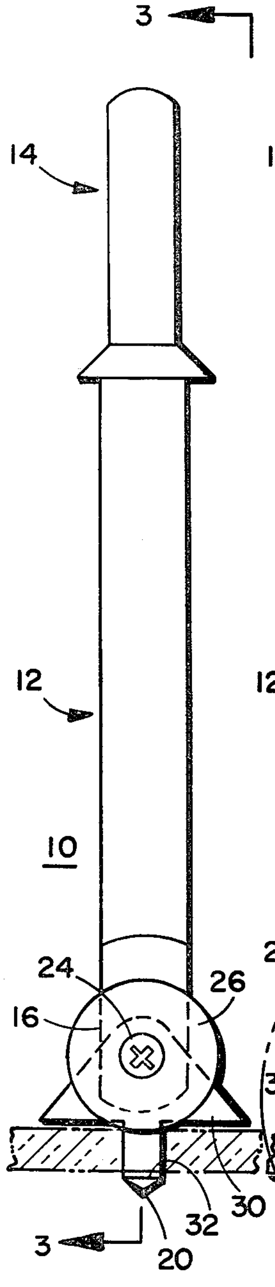
FIG. 2 is a view of the windshield remover along the line 2—2 of FIG. 1.
Figure 3:
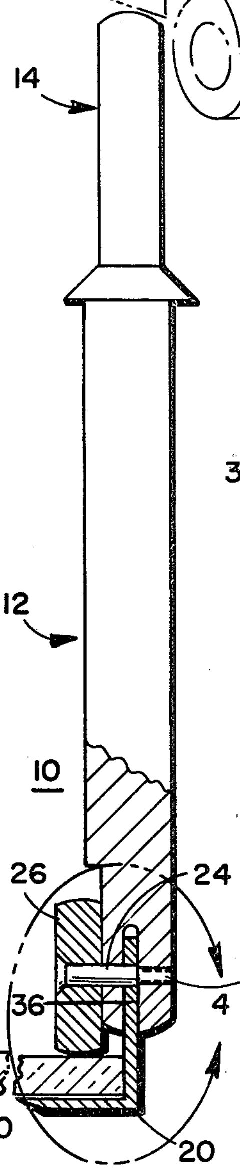
FIG. 3 is a partially cut away side view of the windshield remover of FIG. 2 along the lines 3—3.
Figure 6:
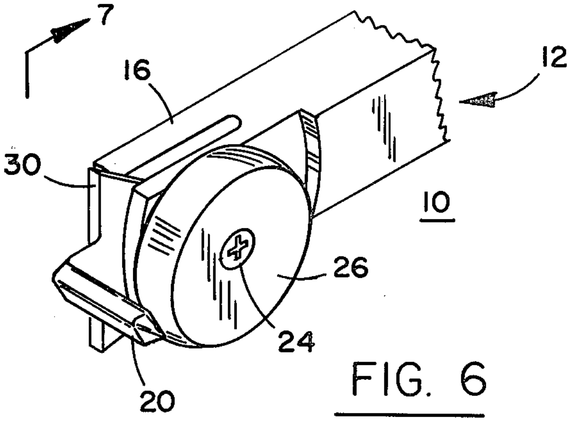
FIG. 6 is a three quarter elevated view of the blade and of the windshield remover of FIG. 2.
Figure 4:
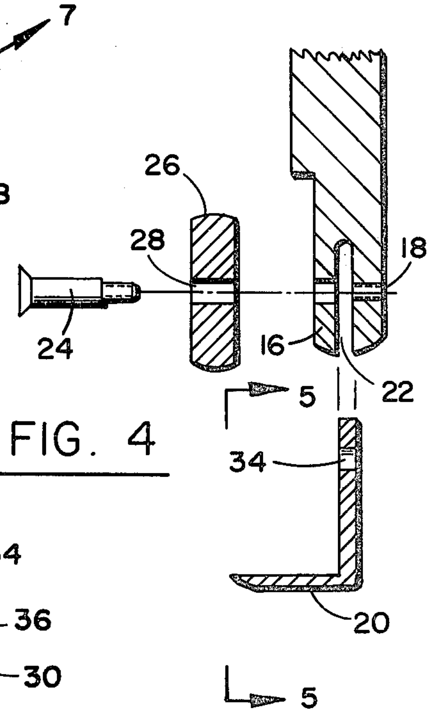
FIG. 4 is a partially cut away view of the windshield remover of FIG. 3 in depth.
Figure 7:
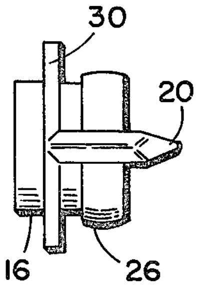
FIG. 7 is a bottom view of the windshield remover of FIG. 6.

Reference should be made at this time to FIG. 1 which illustrates the use of an airtool powered windshield remover 10 in removing a windshield 60. FIG. 1 does not show the operator or the airtool, which is known to the prior art. In operation, the airtool is moved around the edge of the windshield 60 and used to separate the windshield 60 from the automobile 62.

Figure 5:
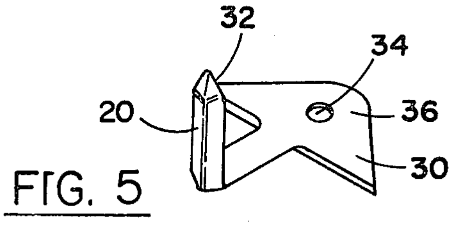
FIG. 5 is a three quarter elevated view of the blade of the windshield remover of FIG. 4.

Reference should be made at this time to FIGS. 2-7 which illustrate various views of the windshield remover 10. The windshield remover 10 comprises a base 12, a first end fourteen which is adapted to couple to an airtool, and a second end 16 which has components used to separate the windshield 60 from the auto 62. The surface of the second end 16 forms a bore or hole 18 and a slot 22. A blade 20 is coupled to the end 16 by a coupling means which may comprise a blot 24 which passes through a blade bore or hole 38 and the hole 18 in the second end 16. A roller 26 having an axial hole 28 therethrough is also coupled to the end 16 by the bolt 24. The blade 20 includes shoulders 30 and a tip 32. The blade that is shown in FIG. 5 includes a blade shoulder or hole 3 through the center of a first end thereof and a blade stem 34 coupled at a 90 degree angle to the second end of the blade base 36. In operation, the blade point or tip 32 is inserted between the edge of the windshield 60 and the auto 62 frame holding the windshield. The blade 20 rotates relatively freely around the hole 3, except that the shoulders 30 prevent the tip 32 from moving beyond a selected point. The air tool is, therefore pressed against the windshield 60 or around the windshield and the tip is forced into the proper position for cutting. The airtool is turned on, and the windshield remover is moved relatively quickly around the edge of the windshield, separating the windshield 62 from the auto 60. The operator holds the airtool so that the base 12 of the windshield remover 10 is relatively perpendicular to the edge of the surface between the windshield 60 and the auto 62 holds the windshield remover 10 in the proper orientation for removal of the windshield 60. The roller 26 rotates freely permitting easy movement of the windshield remover along the surface between the windshield 60 and the automobile 62 and simultaneous retention of the blade 32 in the proper orientation.

The base is disposed about an axis. The second end of the base has a surface defining a planar slot parallel to the axis and a bore near the center of the slot and perpendicular to the slot. The bore of the base may be symmetrical about an axis intercepting the axis of the base at a 90 degree angle. The surface of the base near the second end may define a generally planar groove perpendicular to the bore of the base on the side of the base to which the roller is coupled. The roller means may be axially symmetrical and axially coupled to the coupling means coupled to the bore of the base and capable of rotating around the coupling means. The roller means have a radius greater than the distance from the center of the bore to the end of the second end of the base and a diameter greater than the greatest thickness of the base.

The blade means are L-shaped and have a first stem end comprising a generally arrow shaped generally planar shoulder slightly less thick than the thickness of the slot of the base. The length of the two edges of the arrow adjacent what would be the point of the arrow if it had a point, substantially exceed the distance from the bore to the edge of the base. The end of the arrow where a point would normally be is rounded off. The surface of the arrow defines a bore perpendicular to the plane of the arrow by means of which bore the arrow is coupled rotatably to the coupling means and retained within the slot of the base such that the end of the arrow does not contact the surface defining the slot. The blade means bends at a 90 degree angle at a distance from the bore slightly greater than the radius of the roller, forming a point on the same side of the base as the roller means, but farther from the axis of the base than the farthest surface of the roller. The point is capable of being inserted between the edge of automobile windshields and the frame coupling each windshield to the automobile which contains the windshield.

The two edges of the arrow adjacent to the rounded off end are generally perpendicular to each other and slightly less than twice the greatest width of the second end of the base. The distance between the bore through the arrow and the 90 degree bend of the blade exceeds the radius of the roller by about one quarter inch so that the second end of the blade containing the point extends nearly one quarter inch beyond the edge of the roller. The point of the blade may extend farther from the axis of the base than the roller does, so as to permit the point to pass securely through all the binding material binding the windshield to the frame, thereby insuring that the windshield is separated from the frame.

In operation, the base is coupled to an airtool and the point of the blade is inserted between the windshield and the frame of the automobile. Power from the airtool causes the base to move, causing the blade to move, separating the windshield from the frame. The operator guides the blade around the windshield, separating the entire windshield from the auto frame. A second person or appropriate mechanical means may be utilized to catch the windshield when it falls out of the frame.

A particular example of the invention has been described. Other examples within the scope of the present invention will be obvious to those skilled in the art. The present invention is limited only by the following claims.

We claim:

1. A windshield remover capable of semi-automatic removing of automobile windshields, comprising:

an airtool;

a longitudinal base disposed about an axis and having a first end capable of being coupled to the airtool and powered by the airtool and a second end having a surface defining a planar slot parallel to the axis and further defining a bore near the center of the slot and perpendicular to the slot;

coupling means coupled to the bore;

axially symmetric roller means axially coupled to the coupling means coupled to the bore and capable of rotating around the coupling means, the roller means having a radius greater than the distance from the center of the bore to the end of the second end of the base and a diameter greater than the greatest thickness second end of the base;

L-shaped blade means having a first stem end comprising a generally arrow shaped generally planar shoulder slightly less thick than the thickness of the slot, the length of the two edges of the arrow substantially exceeding the distance from the bore to the edge of the base, the end of the arrow being rounded off, and the surface of the arrow defining a bore perpendicular to the plane of the arrow by means of which bore the arrow is coupled rotatably to the coupling means and retained within the slot of the base such that the end of the arrow does not contact the surface defining the slot, the blade means bending at a 90 degree angle at a distance from the bore slightly greater than the radius of the roller, forming a point slightly farther from the axis of the base than the farthest surface of the roller, the point being capable of being inserted between the edge of automobile windshields and the frame coupling each windshield to the automobile.

2. The invention of claim 1 wherein the bore of the base is symmetrical about an axis intercepting the axis of the base at a 90 degree angle;

the surface of the base near the second end defines a generally planar groove perpendicular to the bore of the base on the side of the base to which the roller is coupled;

and the two edges of the arrow adjacent the rounded off end are generally perpendicular to each other and slightly less than twice the greatest width of the second end of the base, the distance between the bore through the arrow and the 90 degree bend in the blade means exceeding the radius of the roller by about ¼ inch, the second end of the blade extending nearly ¼ inch beyond the edge of the roller.

* * * * *